Feb. 23, 1937. O. L. STARR 2,071,665
POWER TRANSMISSION MECHANISM
Filed April 3, 1934
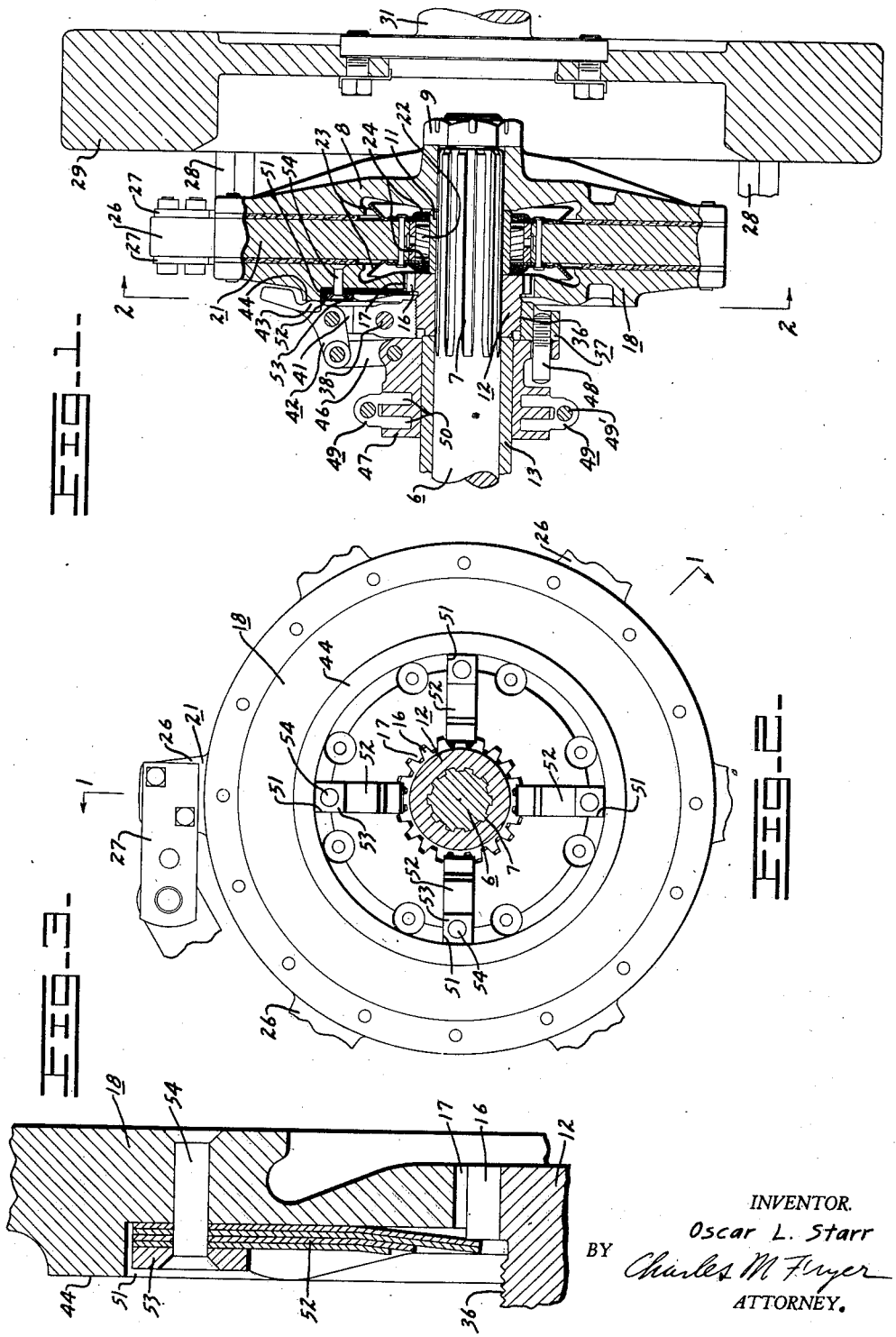
INVENTOR.
Oscar L. Starr
BY Charles M. Fryer
ATTORNEY.

Patented Feb. 23, 1937

2,071,665

UNITED STATES PATENT OFFICE 2,071,665

POWER TRANSMISSION MECHANISM

Oscar L. Starr, Mission San Jose, Calif., assignor to Caterpillar Tractor Co., San Leandro, Calif., a corporation of California Application April 3, 1934, Serial No. 718,780

1 Claim. (Cl. 192—68)

The present invention relates to power transmitting means, and more particularly to an improved clutch construction.

It is an object of the invention to provide a clutch of improved construction in which drag between the driving and driven elements thereof is eliminated when the clutch is disengaged.

Another object of the invention is to provide a clutch of improved construction in which the shiftable element of the clutch is normally urged to clutch disengaging position.

Another object of the invention is to provide a clutch of improved construction, having spring means of simple design for separating the clutch elements, which can be manufactured and assembled in the clutch economically.

Other objects will appear as the description progresses.

Description of figures

Fig. 1 is a sectional view taken through the axis of rotation of the clutch. The upper half of the figure is taken in a vertical plane, and the lower half is taken in a plane at an angle of 45 degrees with respect thereto, as illustrated by the line 1—1 in Fig. 2.

Fig. 2 is an elevational view indicated by the line 2—2 in Fig. 1, with the flywheel omitted.

Fig. 3 is an enlarged fragmentary sectional view, similar to a portion of Fig. 1.

Description of mechanism

The power transmitting means disclosed herein includes generally a driven shaft upon which are mounted a pair of spaced apart relatively shiftable driven clutch members. The driving clutch member is journaled on the shaft between the driven clutch members, and has a drive connection at its periphery with the source of power. Spring means are provided for urging the driven clutch members to the relatively shifted position thereof which serves to interrupt the drive through the clutch.

Clutch driven shaft 6 (Fig. 1) has splined end portion 7 with which driven clutch plate 8 has splined engagement, being secured thereon by nut 9. Spaced apart from plate 8 by spacer 11 is collar 12, also splined on shaft 6 and held against axial movement thereon by sleeve 13, which is suitably held against endwise movement on shaft 6. Collar 12 (Figs. 1 and 2) has peripherally toothed or splined flange portion 16 adjacent an end thereof, which is engaged for axial slidable movement with internal teeth 17 formed within a central aperture of driven clutch plate 18.

Thus, driven clutch plate 18 is mounted on collar 12 for rotation therewith, and for axial displacement with respect thereto and with respect to opposed driven clutch plate 8.

The driving clutch element is mounted for free rotation about shaft 6, between driven clutch plates 8 and 18, and is connected at its periphery to the source of power. Driving plate 21 (Fig. 1) is journaled by means of bearing 22 around spacer 11 and between driven clutch plates 8 and 18; plates 8 and 18 being provided with clutch facings of suitable material to engage plate 21. Oil shields or deflectors 23 are secured to each side of plate 21 around the central aperture therein, and extend outwardly within suitably recessed portions of plates 8, 18 to preclude access of oil to the engaged faces of plates 8, 18 and 21. Seals 24 are seated in shields 23 and engage spacer 11. Lubricant is supplied to bearing 22 through a suitable passage (not shown) in plate 21. At its periphery, plate 21 (Figs. 1 and 2) has a plurality of radial lugs or extensions 26 which are connected by flexible strips or links 27 to studs 28 on flywheel 29. Flywheel 29 is secured to crankshaft 31 of the engine which provides a source of power. From the foregoing description, it is seen that a drive can be established through the clutch by moving plate 18 to the right, as viewed in Fig. 1, to engage plate 21 and cause engagement thereof with plate 8. In this connection, it is to be noted that the mounting of plate 21 on bearings 22 provides for slight axial displacement along the axis of shaft 6.

Manually operable control means is provided for controlling shifting movement of plate 18 which is normally urged to clutch disengaging position. Collar 12 (Fig. 1) has threaded portion 36 adjacent its outer end, which is engaged by internal threads on spider 37 clamped thereon by suitable means including clamping bolt 38 extending transversely of a radial slot in spider 37. Spider 37 has a plurality of forked radial extensions 41, only one of which is seen in Fig. 1. Each extension 41 has a cam lever 42 pivoted therein which has cam end 43 engaging annular raised surface 44 of plate 18. The end of each lever 42 opposite cam end 43 is pivotally connected to link 46 in turn pivotally connected to collar 47. Collar 47 is journaled and slidably mounted on sleeve 13, and is guided by pin 48 threaded in spider 37 and passing through a suitable aperture in collar 47. Thus, plate 18, collar 12, spider 37, and shiftable collar 47 are mounted for rotation as a unit with shaft 6; and axial shifting movement of collar 47 along shaft 6, by means of links 46, oscillates levers 42 to control the axially shifted position of plate 18. In the position shown in Fig. 1, collar 47 is shown shifted to its extreme right-hand position against spider 37. In this position, cams 43 on levers 42 press tightly against plate 18, whereby plate 18 is held in engagement with plate 21 which is also engaged with plate 8. When collar 47 is shifted to the left from the position shown in Fig. 1, cams 43 are released and the clutch is disengaged. The manually operable means for shifting collar 47 includes a collar formed by a pair of opposite similar semi-circular members 49, held together by bolts 49' and having flanges 50 rotatably engaged with complementary annular grooves in collar 47. Members 49 are connected to any suitable linkage to accomplish shifting movement of collar 47.

Spring means is provided for urging plate 18 to clutch disengaging position immediately upon disengagement of the clutch to preclude dragging. Such means includes a plurality of spring members disposed in radial recesses in plate 18, and having their inner ends engaged with an abutment formed on collar 12. Plate 18 (Figs. 2 and 3) is provided with a plurality of radially extending recesses 51 within raised portion 44 thereof, in which spring members 52 are secured by clamping blocks 53 and rivets 54. Each spring member is in the form of a leaf spring which extends inwardly from the point of fastening thereof, and has its free end overlapping toothed portion 16 of collar 12; the toothed portion providing an abutment for the inner end of the spring. As seen in Figs. 1 and 3, when plate 18 is shifted to its extreme right-hand position, leaf springs 52 are flexed or distorted and by virtue of their engagement with toothed portion 16, exert a force tending to move plate 18 to the left. As a result, when collar 47 is shifted to the left to effect disengagement of the clutch by relieving the pressure urging plate 18 to clutch engaging position, spring members 52 become effective to move plate 18 to the left to insure disengagement of the clutch and to eliminate drag between plates 18 and 21, and plates 21 and 8.

It will be observed that resilient means 52 are mounted on the outer surface of an outer clutch element. Therefore, they are readily accessible for assembly, or replacement or repair.

I, therefore, claim as my invention:

In a clutch, a shaft, a plate secured on said shaft, a collar secured on said shaft and spaced from said plate, a shiftable plate mounted on said collar for rotation therewith and for axial movement with respect thereto, a drive plate journaled about said shaft between said first-mentioned plate and said shiftable plate, axial movement of said shiftable plate toward and away from said first-mentioned plate serving respectively to determine and interrupt a drive from said drive plate to said shaft, a plurality of radially disposed recesses formed in said shiftable plate, and a plurality of spring members mounted in said recesses with their inner ends overlapping said collar, said spring members urging said shiftable plate to drive interrupting position.

OSCAR L. STARR.